(12) United States Patent
Swinkels et al.

(10) Patent No.: US 8,166,183 B2
(45) Date of Patent: Apr. 24, 2012

(54) METHOD AND SYSTEM FOR FAST VIRTUAL CONCATENATION SETUP IN A COMMUNICATION NETWORK

(75) Inventors: Gerard L. Swinkels, Ottawa (CA); Darek Skalecki, Kanata (CA)

(73) Assignee: Ciena Corporation, Linthicum, MD (US)

(*) Notice: Subject to any disclaimer, the term of this patent is extended or adjusted under 35 U.S.C. 154(b) by 154 days.

(21) Appl. No.: 12/718,733

(22) Filed: Mar. 5, 2010

(65) Prior Publication Data

US 2011/0219128 A1 Sep. 8, 2011

(51) Int. Cl.
*G06F 13/00* (2006.01)
(52) U.S. Cl. .................................... 709/228
(58) Field of Classification Search .......... 370/464, 370/466, 467, 468; 709/227, 228, 230
See application file for complete search history.

(56) References Cited

U.S. PATENT DOCUMENTS

| | | | | |
|---|---|---|---|---|
| 2006/0187715 A1* | 8/2006 | Narvaez et al. | .......... | 365/185.24 |
| 2008/0159156 A1* | 7/2008 | Takeuchi et al. | .............. | 370/248 |
| 2009/0154493 A1* | 6/2009 | Hinderthuer | .................. | 370/466 |
| 2009/0213873 A1* | 8/2009 | Frlan et al. | .................... | 370/464 |
| 2010/0254709 A1* | 10/2010 | Narvaez et al. | ................. | 398/98 |

* cited by examiner

*Primary Examiner* — Robert B Harrell
(74) *Attorney, Agent, or Firm* — Christopher & Weisberg, P.A.

(57) ABSTRACT

The invention is directed to optimizing setup of a VCAT connections using (largest) CCAT containers so as to minimize the number of cross-connection commands needed to enable data transfer. A system and method are provided for enhancing VCAT networks to include faster service restoration rates and faster connection setup times. One embodiment includes expanding available VCAT timeslots to include available CCAT timeslots. A routing and signaling control module alerts a source network element, internal network elements and a destination network element that the data transmission includes VCAT payloads rather than the expected CCAT payloads. By issuing this alert, the routing and signaling control module instructs an end-point monitoring function to overlook any mismatch between the expected CCAT rate and the received VCAT traffic. Otherwise, if the mismatch is not overlooked, then the end-point monitoring function will squelch the received VCAT traffic, which terminates the data communication.

20 Claims, 5 Drawing Sheets

METHOD AND SYSTEM FOR FAST VIRTUAL CONCATENATION SETUP IN A COMMUNICATION NETWORK

FIELD OF THE INVENTION

The present invention relates generally to telecommunication networks. More specifically, the present invention relates to a method and system for increasing restoration speed and reducing connection setup times of virtual concatenation (VCAT) networks.

BACKGROUND OF THE INVENTION

Different telecommunication transport schemes are used to implement communication networks. For example, Ethernet is typically used to provide communications within local area network (LAN) environments. Ethernet has become the standard for LANs and is generally available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae). Synchronous Optical Network (SONET) or the Synchronous Digital Hierarchy (SDH), as it is known in Europe, is used to transport communications throughout wide area network (WAN) environments.

SONET/SDH is recognized as a practical way to link high speed Ethernet networks over WANs. A persistent problem with transporting Ethernet over SONET (EOS) is inefficient use of system resources. For example, SONET was designed to carry DS1 (1.544 Mbits/sec) and DS3 (44.736 Mbits/sec) signals. Beyond the STS-3 (155.520 Mbits/sec) rate, SONET grows by a factor of four. The fundamental Ethernet rates do not support DS1 or DS3 rates and grow in multiples of ten. As a result, the various Ethernet transmission rates (10 Mbps, 100 Mbps, 1,000 Mbps, and 10,000 Mbps) do not map well into SONET/SDH frames.

For example, the original 10 Mbps Ethernet signal is too small for an entire STS-1 (51.84 Mbps) path. Under existing SONET/SDH schemes, an entire STS-1 path is needed to transport a 10 Mbps Ethernet signal. The rate mismatch between SONET and Ethernet results in large bandwidth inefficiencies. In other words, a significant amount of bandwidth is wasted by linking high speed Ethernet networks using SONET/SDH frames. Similar inefficiencies results when attempting to map the faster Ethernet signals into STS signals.

A Virtual Concatenation (VCAT) Protocol was created to efficiently map Ethernet signals into SONET/SDH frames. VCAT increases efficiencies by allowing SONET payloads to combine into a single, virtual payload. For example, VCAT combines multiple signals (members) into one Virtual Concatenation Group (VCG), enabling the carrier to optimize the SDH/SONET links for Ethernet traffic. For example, Two STS-1 (51 Mbps) signals can be combined to carry a 100 Mbps Ethernet signal. VCAT uses SONET/SDH overhead bytes to indicate two numbers: the multiframe indicator (MFI) and the sequence number (SQ). The VCAT intelligence resides at endpoints of SONET paths, so the SONET network does not need to have knowledge of VCAT.

Individual members of a VCG may traverse different network paths while traveling between endpoints, e.g., an origination point and a destination point. Thus, members may arrive at their destination out of order and with different delays. This situation is generally referred to as "skewing". In order to reassemble the members of a VCG in proper order without undue delay and without losing any members, the arriving members must be buffered and de-skewed. De-skewing uses the multi-frame indicator (MFI) as a time stamp to align all of the VCG members. In its simplest form, de-skewing involves placing members of a VCG in a buffer until the member with the most delay is received. When all members of a VCG are received, they are read out of the buffer in the proper order. Typically, the members are written to RAM with an address based on their MFI numbers.

During a service interruption, SONET/SDH technology is able to detect and restore a connection. For networks having few connections, service restoration may occur virtually instantly, i.e., 50 milliseconds. For networks having many connections, service restoration may take several seconds. As such, reducing the number of connections between endpoints reduces setup connection times or service restoration times when recovering from service disruptions. Therefore, what is needed is a system and method for reducing the number of connections between endpoints while still supporting VCAT.

SUMMARY OF THE INVENTION

The present invention advantageously provides a method and system for improving the restoration speed or the connection setup time for WAN networks by incorporating CCAT features into VCAT networks. According to one embodiment, the invention efficiently restores service to the VCAT network after a service interruption.

According to one embodiment, a method is provided of establishing a fast virtual concatenation (VCAT) connection. The method includes receiving at a network element a data signal having a VCAT path computation associated with a virtual concatenation network. The network element analyzes contiguous concatenation (CCAT) timeslot availability for transporting the data signal through the virtual concatenation network and adjusts the VCAT path computation to include transporting the data signal using the available CCAT timeslots. The network element issues at least one command to setup the data signal through the VCAT network using the available CCAT timeslots.

According to another embodiment, a network element is provided for establishing a fast virtual concatenation (VCAT) connection. The network element includes an input port and a transceiver that is operable to receive a data signal from the input port having a VCAT path computation associated with a virtual concatenation network. The network element further includes a processor electrically connected to the transceiver, the processor is operable to analyze contiguous concatenation (CCAT) timeslot availability for transporting the data signal through the virtual concatenation network and adjust the VCAT path computation to include transporting the data signal using the available CCAT timeslots. The processor issues at least one command to set up the data signal through the VCAT network using the available CCAT timeslots, wherein the network element is operable to establish fast VCAT connections.

According to still another embodiment of the invention, a network element is provided for establishing a fast virtual concatenation (VCAT) connection. The network element includes an input port and a path computation module that receives a data signal from the input port having a VCAT path computation associated with a virtual concatenation network, the path computation module analyzing contiguous concatenation (CCAT) timeslot availability for transporting the data signal through the virtual concatenation network, the path computation module adjusting the VCAT path computation to include transporting the data signal using the available CCAT timeslots. The network element further includes a routing and signaling control module that issues at least one command to set up the data signal through the VCAT network using the available CCAT timeslots.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION OF THE INVENTION

Figure 1:
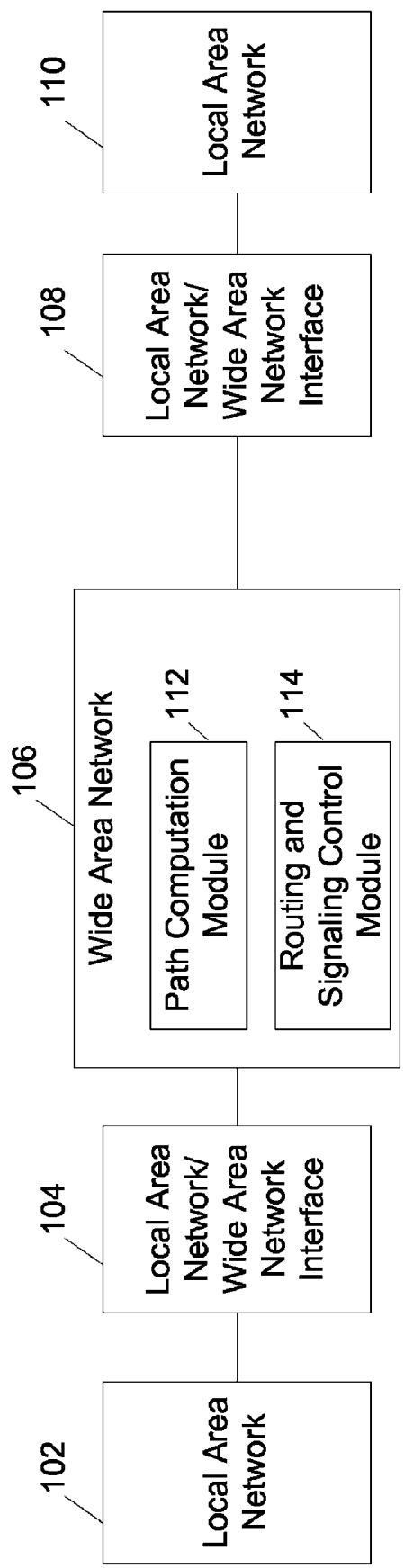
FIG. 1 is a block diagram of an exemplary system constructed in accordance with the principles of the present invention.

Before describing in detail exemplary embodiments that are in accordance with the present invention, it is noted that the embodiments reside primarily in combinations of apparatus components and processing steps related to implementing a system and method of providing an optical Wide Area Network (WAN) arrangement that efficiently restores service after a service interruption. The WAN is a communication network that spans relatively large geographical areas and includes long distance transmission technologies. The invention applies principles of Contiguous Concatenation (CCAT), including reducing the number of commands issued to internal network elements, to quickly restore service over a Virtual Concatenation (VCAT) architecture.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Typical WANs utilize Time Division Multiplexing (TDM) over a Synchronous Optical Network (SONET) network architecture or a Synchronous Digital Hierarchy (SDH) network architecture. SDH is a European version of a standard that is substantially the same as the SONET standard developed in North America. One of ordinary skill in the art will readily appreciate that the WAN also may be implemented using Optical Transmission Network (OTN) architectures, among other WAN architectures. WANs may be used to couple Local Area Networks (LANs).

LANs are generally confined to a single building or group of buildings and utilize Ethernet network architectures, among other LAN architectures. As illustrated in FIG. 1, a first LAN 102 may be connected through a WAN 106 to a second LAN 110. The WAN 106 is a communication network that spans relatively large geographical areas. LAN/WAN interfaces 104,108 may be provided to couple LANs 102,110 and WAN 106. One of ordinary skill in the art will readily appreciate that public networks, such as telephone systems, may be used to connect the LANs 102,110 to the WAN 106. The WAN 106 also may be connected to LANs 102,110 through leased lines or satellite systems, among other networks. As discussed below in detail, the WAN 106 may include a path computation module 112 and a routing and signaling control module 114 that support expanded Contiguous Concatenation (CCAT) timeslot availability over a Virtual Concatenation (VCAT) network in accordance with the principles of the present invention.

SONET standards originally were designed to support voice networks. SONET networks allocate fixed bandwidth time slots for each circuit and use connection-oriented synchronous TDM circuit switching technology to operate at a same clock domain. Bandwidth is allocated for an application when a circuit is established and the bandwidth cannot be used by any other application, even if the original application is not using the bandwidth. Therefore, SONET networks are considered bandwidth inefficient for non-circuit based services such as packet based services.

SONET provides three options for payload granularity: (1) channelized, individual STS-1s and Virtual Tributaries (VTs); (2) Contiguous Concatenation (CCAT) of STS-1s; and (3) Virtual Concatenation (VCAT) of STS-1s or VTs. Under the first option, each individual STS-1 is 51.840 Mbps, with 50.112 Mbps of data capacity and 1.728 Mbps of overhead. The VTs are configured in 4 sizes: VT1.5 (1.728 Mbps), VT2 (2.304 Mbps), VT3 (~3.456 Mbps), and VT6.0 (~6.912 Mbps). The channelized SONET is configured to support the traditional TDM hierarchy.

Under the second option, CCAT bundles the STS-1s into five standard sizes: STS-3c, 12c, 48c, 192c, 768c. While packaged in standard sizes, the CCAT STS-1s are positioned adjacent to each other and the STS-Ncs are subjected to alignment constraints, including beginning at designated STS numbers.

Under the third option, VCAT may be defined for either STSs or VTs. The STSs/VTs in a virtual concatenated SONET Payload Envelope (SPE) may be positioned non-adjacent to each other. Therefore, the SPEs may traverse multiple paths and multiple internal network elements between the source network element and the destination network element. VCAT is a scheme for splitting data that depart from a source network element into multiple data streams and recombining the multiple data streams at a destination network element to reconstruct the original data sequence. In other words, the VCAT scheme breaks an integral payload into individual SPEs, transports each SPE separately along a communication network and then recombines the individual SPEs into a contiguous bandwidth at the destination network element. VCAT applies concatenation functionality at the source network element and at the destination network element.

SONET networks provide characteristics that are desirable for voice quality networks, including reliable connections with guaranteed available bandwidth and low jitter. However, SONET networks are not desirable for data networks because they are bandwidth inefficient and use higher overhead than other network architectures. SONET architectures may use connection based protocols between switching ports to provide physical circuit arrangements that establish end to end paths having the same transmission rates. However, the digital signals transmitted through the SONET network may experience phase differences between transmitted signals due to time delays, jitter or other signal variations produced by the transmission system.

In contrast to SONET, Ethernet was designed primarily for use with data networks. Ethernet is a connectionless asynchronous Collision Sense, Multiple Access with Collision Detection (CSMA/CD) packet switching technology. Ethernet networks provide low cost bandwidth connections and low reliability best effort delivery. Within the Ethernet network, applications transmit data packets that travel from node to node without establishing a physical or logical circuit. Therefore, Ethernet uses low overhead, but does not guarantee transmission. In contrast to the SONET architecture described above, the Ethernet architecture sends a series of data packets across the network and does not rely on a single clock domain. These characteristics are suitable for data quality networks.

The present invention advantageously provides a system and method of increasing the service restoration speed following a service disruption. In the case of control plane owned services, the invention provides a system and method that uses a fast connection setup following a service disruption. The system and method perform service restoration and connection setup similarly. As a result, these terms are used interchangeably throughout the specification.

The invention improves the restoration speed or the connection setup time for WAN networks by incorporating CCAT features into VCAT networks. According to one embodiment, the invention efficiently restores service to the VCAT network after a service interruption. Service interruptions may result from various conditions, including severed transmission cables, inoperable switches or other service interruption conditions. The invention improves the service restoration speed or connection setup time of the VCAT network by reducing a number of setup commands or cross-connection requests issued over the VCAT network. In other words, the invention provides an efficient method and system for restoring data transmission paths following service interruptions.

Traditionally, SONET network operators reserve additional bandwidth for each data communication request. The reserved additional bandwidth is removed from available system bandwidth. In other words, the system maintains the reserved additional bandwidth in an idle state and renders the bandwidth unavailable to other data communication requests until the primary data communication is successfully completed. After the primary data communication is successfully completed, the system releases the reserved additional bandwidth for use with other data communication requests.

In traditional SONET networks, the system is guaranteed access to the reserved additional bandwidth during a service disruption and the reserved additional bandwidth is provided within a predefined time period, such as 50 ms, among other predefined time periods. The system uses the reserved additional bandwidth to re-establish a service connection. This connection recovery scheme is referred to as a protected service scheme. The protected service scheme is inefficient from a network perspective for several reasons, including that the reserved additional bandwidth is removed from system available bandwidth until after the primary data communication is completed. The invention improves upon known connection recovery schemes that remove additional network bandwidth from available system bandwidth in exchange for providing fast service restoration after a service disruption.

Figure 2:
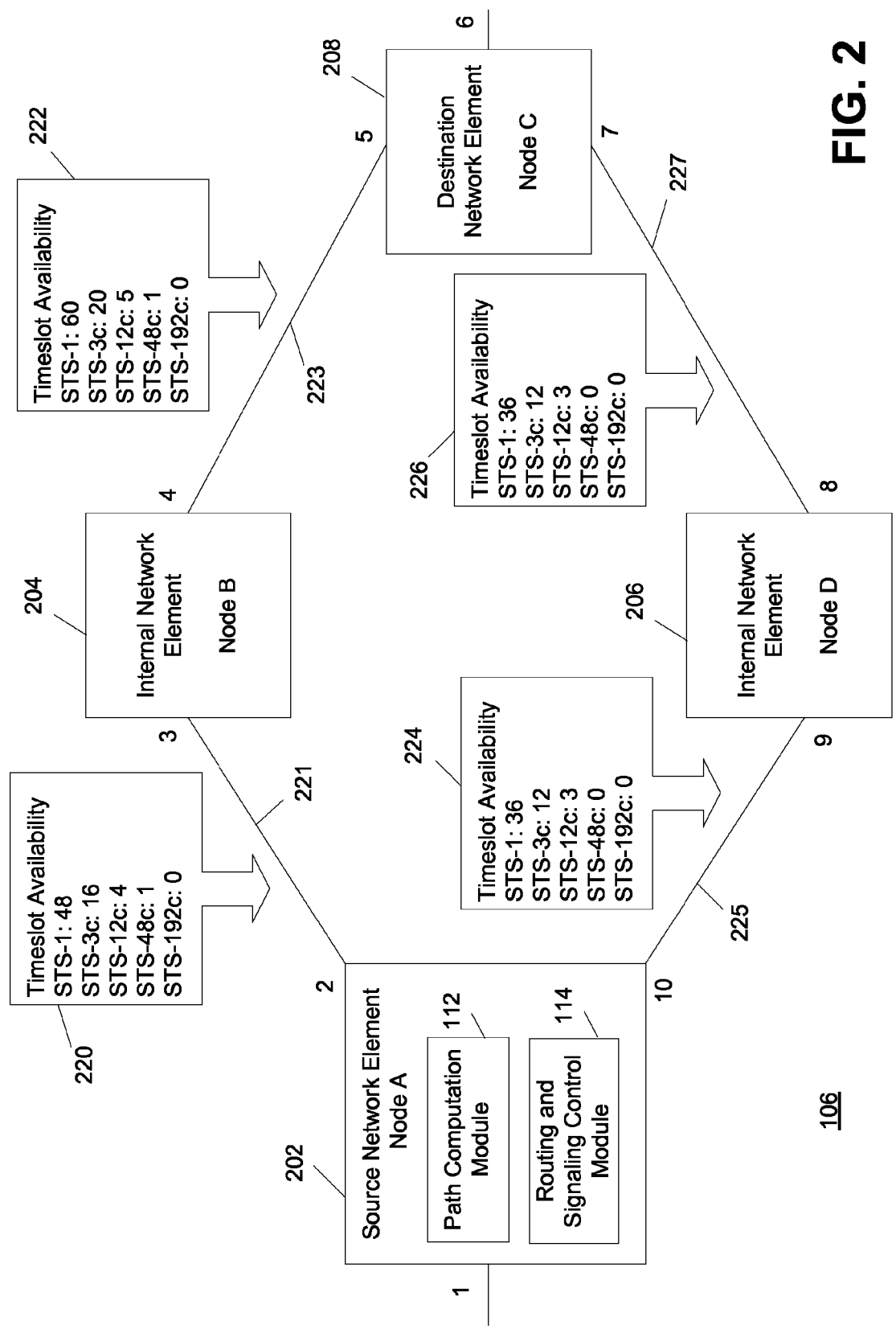
FIG. 2 is a block diagram of an exemplary embodiment of a wide area network (WAN), constructed in accordance with the principles of the present invention.

An exemplary implementation of the present invention is described with reference to FIG. 2. FIG. 2 illustrates the WAN 106 having a plurality of network elements, including a source network element 202, intermediate network elements 204, 206, and a destination network element 208. Other network element configurations may be provided. The network elements include but are not limited to routers, switches, such as SONET switches, and other network elements. The network elements may include hardware components, such as input ports, output ports, processors, memory devices, transceivers and programmable logic, among other components. The network elements include ports that support and/or perform cross-connect functions. For example, source network element 202 includes ports 1, 2 and 10; network element 204 includes ports 3 and 4, network element 206 includes ports 8 and 9; and destination network element 208 includes ports 5, 6 and 7.

The source network element 202 may be of modular construction to facilitate adding, deleting, updating and/or amending modules therein and/or features within modules. The source network element 202 may include modules, such as a path computation module 112 and a routing and signaling control module 114, among other modules. The path computation module 112 is provided to analyze timeslot availability along the communication ports between the source network element 202, the internal network elements 204,206 and the destination network element 208. The routing and signaling control module 114 is provided to establish cross-connections and perform associated routing and signaling functions. It should be readily understood that a greater or lesser number of modules might be used. One skilled in the art will readily appreciate that the invention may be implemented using individual modules, a single module that incorporates the features of two or more separately described modules, individual software programs, and/or a single software program. According to one embodiment, the modules may be implemented using hardware, such as application specific integrated circuits and programmable gate arrays among other hardware components.

It is also noted that the path computation module 112 and the routing and signaling control module 114 may be located at other devices remote from the WAN 106, including the LAN/WAN interfaces 104, 108, the LANs 102, 110, a router or a network manager station, among other devices.

The ports are configured to route data to and from their respective network elements in response to cross-connect commands received from the routing and signaling control module 114. For example, the system may issue a cross-connect command instructing the source network element 202 to route data from port 1 to port 2. Furthermore, the system may establish communication links between ports of different network elements. For example, the system may establish a communication link between port 2 of the source network element 202 and port 3 of the network element 204. According to one embodiment, the system maintains timeslot availability information for the communication links between network elements.

Conventional VCAT networks support a limited number of pre-defined VCAT available timeslots, including: STS-1 and STS-3c. By contrast, CCAT networks support an expanded number of pre-defined CCAT available timeslots, including: STS-1, STS-3c, STS-12c, STS-21c, STS-24c, STS-48c, STS-96c and STS-192c. According to one embodiment, the invention advantageously enables the VCAT network to support the expanded number of CCAT available timeslots, thereby reducing the number of connections needed to complete VCAT data transmissions.

VCAT protocols divide data traffic into two or more data streams, each of which is sent over different connections. For example, the source network element 202 splits data transmissions received from the LAN/WAN interface 104 into two data streams, one of which is transmitted over path A-B-C and the other of which is transmitted over path A-D-C. The two data streams are reassembled into the original data transmission at the destination network element 208 for transmission to the WAN/LAN interface 108. Data transmitted over various paths and various STS-1 or STS-3c channels arrive at the destination network element 208 at different times, with varying amounts of transmission delay. The destination network element 208 receives the data packets that travel through the WAN network and reconstructs the originally transmitted data upon receipt of all the data packets. As a result, the data packet that arrives at the destination network element 208 with the longest delay establishes the data packet transmission rate.

The invention provides a VCAT network with adaptive payload processing supported by the expanded CCAT timeslot availability. The expanded CCAT timeslot availability reduces the number of overall connections traversed by the data packets between the source network element 202 and the destination network element 208. In effect, the data packet transmission rate for the VCAT network is increased by using a larger payload capacity provided by the available CCAT timeslots.

Returning to FIG. 2, the communication link 221 between the source network element 202 and the network element 204 supports available timeslots of 48 STS-1s, 16 STS-3cs, 4 STS-12cs, 1 STS-48c and 0 STS-192c, among other available timeslots. The communication link 223 between the network element 204 and the destination network element 208 supports available timeslots of 60 STS-1s, 20 STS-3cs, 5 STS-12cs, 1 STS-48c and 0 STS-192c, among other available timeslots. The communication link 225 between the source network element 202 and the network element 206 supports available timeslots of 36 STS-1s, 12 STS-3cs, 3 STS-12cs, 0 STS-48c and 0 STS-192c, among other available timeslots. The communication link 227 between the network element 206 and the destination network element 208 supports available timeslots of 36 STS-1s, 12 STS-3cs, 3 STS-12cs, 0 STS-48c and 0 STS-192c, among other available timeslots.

The invention leverages the expanded CCAT timeslot availability to provide efficient restoration options for an unprotected service scheme. Unprotected service schemes allow the system to perform service restoration after a service disruption without reserving additional network bandwidth from available system bandwidth, i.e. without employing protection. According to one embodiment, the system uses endpoint connectivity management control granted to end users by network operators to optimize timeslot availability assignments.

Figure 3:
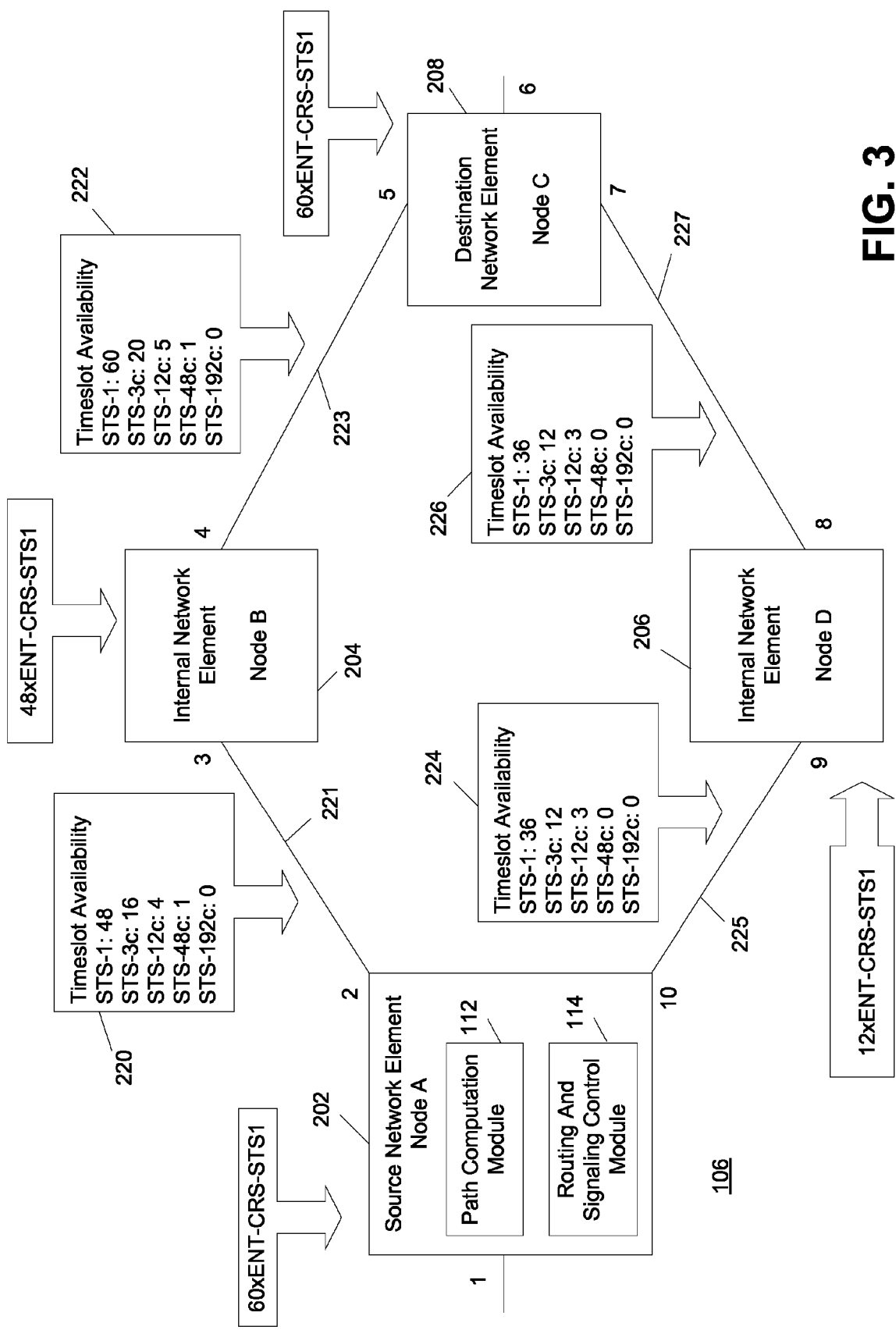
FIG. 3 is a block diagram of another exemplary embodiment of a WAN, constructed in accordance with the principles of the present invention.

Another exemplary implementation of the present invention is described with reference to FIG. 3. FIG. 3 illustrates an embodiment in which the WAN 106 routes a STS1-60v signal. FIG. 3 depicts a VCAT path computation using STS1 timeslots. The path computation module 112 establishes 60 STS1 signals at the source network element 202 for routing the received STS1-60v signal along paths A-B-C and A-D-C. The path along A-B-C provides the largest number of available STS1 timeslots, with up to 48 STS1 timeslots available on link A-B and up to 60 STS1 timeslots available on link B-C. The path along A-D-C provides fewer available STS1 timeslots, with up to 36 STS1 timeslots available on link A-D and up to 36 STS1 timeslots available on link D-C. According to one embodiment, the path computation module 112 routes the maximum number of data signals using the 48 STS1 timeslots along path A-B-C and routes the remaining data signals using the 12 STS1 timeslots along path A-D-C.

According to one embodiment, the path computation module 112 establishes an initial path computation for transmitting the data signals using 48 STS1 timeslots from the source network element 202 to the internal network element 204 on link A-B. Furthermore, the path computation module 112 establishes an initial path computation for transmitting the data signals using 48 STS1 timeslots from the internal network element 204 to the destination network element 208 on link B-C (Step S400). Link B-C has 12 STS1 timeslots that are unused during this data transmission.

The routing and signaling control module 114 issues command to the source network element 202 to install cross-connections between port 1 and port 2; the internal network element 204 to install cross-connections between port 3 and port 4; and the destination network element 208 to install cross-connections between port 5 and port 6 (step S402). In order to implement the cross-connections and perform the data routing function, the routing and signaling control module 114 issues 48 STS1 commands to the source network element 202, 48 STS1 commands to the internal network element 204, and 48 STS1 commands to the destination network element 208. The routing and signaling control module 114 issues 144 commands to implement the cross-connections and enable data transfer along path A-B-C.

Additionally, the path computation module 112 establishes an initial path computation for transmitting the remaining data signals using 12 STS1 timeslots from the source network element 202 to the internal network element 206 on link A-D. Furthermore, the path computation module 112 establishes an initial path computation for transmitting the data signals using 12 STS1 timeslots from the internal network element 206 to the destination network element 208 on link D-C (Step S404). Links A-D and D-C have 24 STS1 timeslots that are unused during this data transmission.

According to one embodiment, the routing and signaling control module 114 issues command to the source network element 202 to install cross-connections between port 1 and port 10; the internal network element 206 to install cross-connections between port 9 and port 8; and the destination network element 208 to install cross-connections between port 7 and port 6 (Step S406). In order to implement the cross-connections and perform the data routing function, the routing and signaling control module 114 issues 12 STS1 commands to the source network element 202, 12 STS1 commands to the internal network element 206, and 12 STS1 commands to the destination network element 208 (Step S410). The routing and signaling control module 114 issues 36 commands to implement the cross-connections and enable data transfer along path A-D-C.

In this example, the VCAT routing scheme issues 180 commands to route the 60 STS1 signals along paths A-B-C and A-D-C. From a network performance perspective, processing the 180 commands issued by the routing and signaling control module 114 to transport the data packets introduces a significant delay. For example, the delay may be on the order of several minutes.

To reduce the significant delay, the invention uses the expanded CCAT timeslot availability in the VCAT network to enable adaptive payload processing. According to one embodiment, the VCAT system packages data into larger payloads to reduce the number of commands needed to route the data on the communication links.

The invention may be applied to unprotected service schemes for VCAT networks to provide faster service restoration rates and faster connection setup times, resulting in minimal delays for restoration operations in response to service interruptions. For example, the minimal delays may be on the order of seconds. According to one embodiment, the invention may be deployed over WAN networks, among other networks. For example, the invention may provide a fast connection setup for transporting Ethernet frames over a SONET network.

Figure 4:
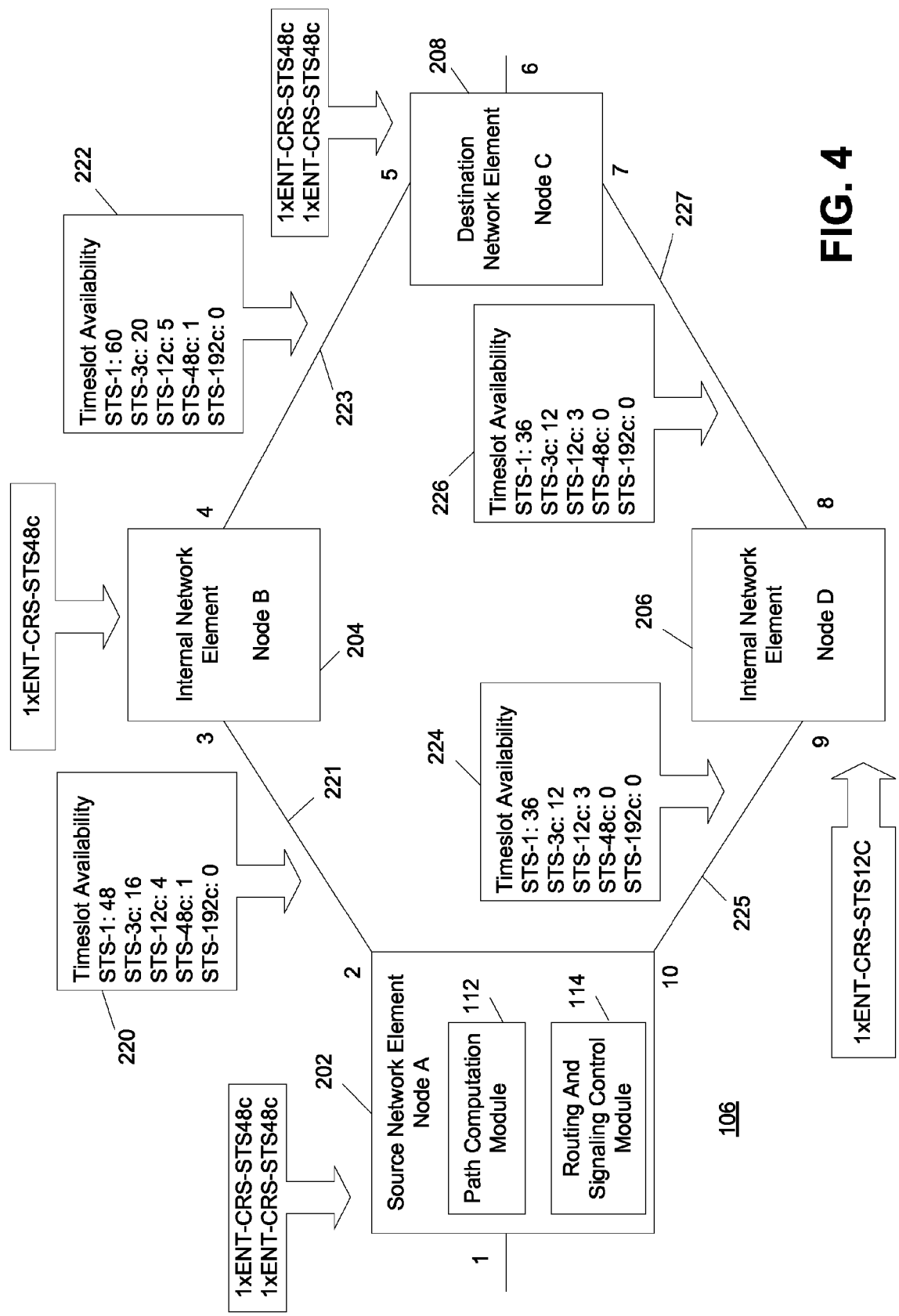
FIG. 4 is a block diagram of yet another exemplary embodiment of a WAN, constructed in accordance with the principles of the present invention.

Another exemplary implementation of the present invention is described with reference to FIG. 4. FIG. 4 illustrates another exemplary embodiment in which the WAN 106 routes a STS1-60v signal. According to one embodiment, the invention uses the path computation module 112 to analyze expanded CCAT timeslot availability on the communication links between the source network element 202, the internal network elements 204, 206 and the destination network element 208.

Figure 5:
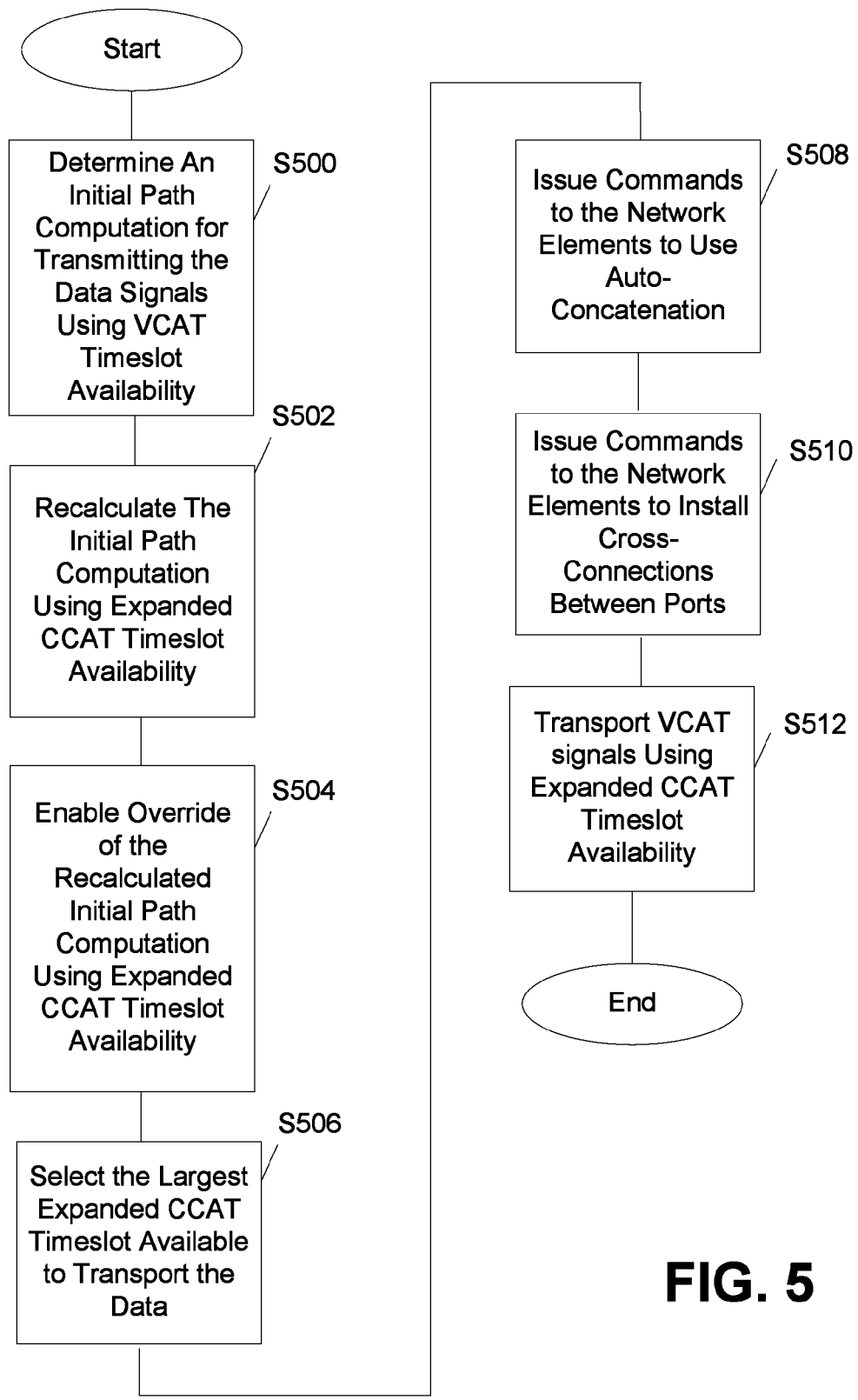
FIG. 5 is a flow chart of an exemplary service restoration process in accordance with the principles of the present invention.

According to one embodiment of the present invention described with reference to the flow chart of FIG. 5, the path computation module determines an initial path computation using VCAT timeslot availability (Step S500). The path computation module recalculates the VCAT path computation using the expanded CCAT timeslot availability of the present invention (Step S502). The path computation module 112 establishes 1 STS48c and 1 STS12c signals at the source network element 202 for routing the received STS1-60v signal along paths A-B-C and A-D-C, respectively.

The path computation results generated by the path computation module 112 using the expanded CCAT available timeslots may be overridden by end users through manually entering modified path computation results (Step S504). The path computation results may be recalculated for various reasons, including complying with imposed restrictions, such as bandwidth limitations among other restrictions.

When adapting the data communication from a VCAT timeslot to a CCAT timeslot, the system may be configured to provide larger available CCAT timeslots in order to enhance speed or to maintain a balanced link aggregation number. If desired bandwidth is unavailable, smaller available CCAT timeslots may be selected. For example, a request to adapt a VCAT VC4-16v timeslot to a CCAT timeslot would render at least a CCAT VC4-16c timeslot. Similarly, a request to adapt a VCAT VC4-15v timeslot to a CCAT timeslot would render at least a CCAT VC4-16c timeslot. Other techniques for adapting the VCAT data transmission into the largest CCAT timeslot include resource management of the virtualized network element in a cross connect controller control plane S/W or network element, among other techniques.

The path computation module 112 analyzes the expanded CCAT timeslots availability along paths A-B-C and A-D-C and determines that the STS48c timeslot along path A-B-C provides the largest available STS48c timeslot (Step S506). In particular, 1 STS48c timeslot is available on link A-B and 1 STS48c timeslot is available on link B-C. The path computation module 112 determines that STS12c timeslots are the largest expanded CCAT timeslots available along path A-D-C. In particular, 3 STS12c timeslots are available on link A-D and 3 STS12c timeslots are available on link D-C. Accordingly, the path computation module 112 selects to transport the STS1-60v data signals using the STS48c timeslot along path A-B-C and the STS12c timeslot along path A-D-C.

According to one embodiment, the path computation module 112 establishes an initial CCAT path computation for transmitting the data signals using the STS48c timeslot from the source network element 202 to the internal network element 204 on link A-B. Furthermore, the path computation module 112 establishes an initial CCAT path computation for transmitting the data signals using the STS48c timeslot from the internal network element 204 to the destination network element 208 on link B-C. Users may override the initial CCAT path computation manually or otherwise to provide a larger timeslot or smaller timeslots for transporting the data between the source network element 202, the internal network element 204 and the destination network element 208. One of ordinary skill in the art will readily appreciates that the timeslots selected on link A-B may differ from the timeslots selected on link B-C.

After selecting the computed paths, the routing and signaling control module 114 sends signals to the source network element 202, the internal network element 204 and the destination network element 208 instructing these devices to apply or use auto-concatenation (Step S508). In other words, the routing and signaling control module 114 alerts the source network element 202, the internal network element 204 and the destination network element 208 that the data transmission includes 48 STS1s signals rather than the expected STS48c signal. By issuing this alert, the routing and signaling control module 114 instructs an end-point monitoring function to overlook any mismatch between the expected CCAT rate and the received VCAT traffic. If the mismatch is not overlooked, then the end-point monitoring function will squelch the received VCAT traffic, which terminates the data communication.

With auto-concatenation activated, the routing and signaling control module 114 instructs the source network element 202 to install cross-connections between port 1 and port 2; the internal network element 204 to install cross-connections between port 3 and port 4; and the destination network element 208 to install cross-connections between port 5 and port 6 (Step S510). In order to implement this data routing function, the routing and signaling control module 114 issues 1 STS48c command to the source network element 202, 1 STS48c command to the internal network element 204, and 1 STS48c command to the destination network element 208. In other words, the routing and signaling control module 114 issues 3 commands to implement the data transfer along path A-B-C. The 3 commands issued by the routing and signaling control module 114 to implement data transmission using the expanded CCAT timeslots is substantially less than the 144 commands issued by the routing and signaling control module 114 to implement data transmission using the limited VCAT timeslots. The network elements transport the VCAT signals over the network using expanded CCAT timeslot availability (Step S512).

Additionally, the path computation module 112 establishes an initial path computation for transmitting the remaining data signals using a STS12c timeslot from the source network element 202 to the internal network element 206 on link A-D. Furthermore, the path computation module 112 establishes an initial path computation for transmitting the data signals using the STS12c timeslot from the internal network element 206 to the destination network element 208 on link D-C. Users may override the initial path computation manually or otherwise to provide a larger timeslot or smaller timeslots for transporting the data between the source network element 202, the internal network element 206 and the destination network element 208. One of ordinary skill in the art will readily appreciates that the timeslots selected on link A-D may differ from the timeslots selected on link D-C.

After selecting the computed paths, the routing and signaling control module 114 sends signals to the source network element 202, the internal network element 206 and the destination network element 208 instructing these devices to apply or use auto-concatenation. In other words, the routing and signaling control module 114 alerts the source network element 202, the internal network element 206 and the destination network element 208 that the data transmission includes 12 STS1s signals rather than the expected STS12c signal. By issuing this alert, the routing and signaling control module 114 instructs an end-point monitoring function to overlook any mismatch between the expected CCAT rate and the received VCAT traffic. If the mismatch is not overlooked, then the end-point monitoring function will squelch the received VCAT traffic, which terminates the data communication.

With auto-concatenation activated, the routing and signaling control module 114 instructs the source network element 202 to install cross-connections between port 1 and port 10; the internal network element 206 to install cross-connections between port 9 and port 8; and the destination network element 208 to install cross-connections between port 7 and port 6. In order to implement this data routing function, the routing and signaling control module 114 issues 1 STS12c command to the source network element 202, 1 STS12c command to the internal network element 206, and 1 STS12c command to the destination network element 208. In other words, the routing and signaling control module 114 issues 3 commands to implement the data transfer along path A-D-C. The 3 commands issued by the routing and signaling control module 114 to implement data transmission using the expanded CCAT timeslots is substantially less than the 36 commands issued by the routing and signaling control module 114 to implement data transmission using the limited VCAT timeslots.

In total, the VCAT path computation using the expanded CCAT available timeslots uses 6 commands to route the 1 STS48c and 1 STS12c signals along paths A-B-C and A-D-C, respectively. From a network performance perspective, processing 6 commands issued by the routing and signaling control module 114 to transport the data packets introduces a negligible delay. The negligible delay may be on the order of seconds.

The invention enhances the VCAT network using the expanded CCAT timeslot availability to provide adaptive payload processing. In particular, the invention enables the VCAT network to package data into larger payloads in order to reduce the number of commands needed for routing data along the communication links. The invention enhances unprotected service schemes for VCAT networks by providing faster service restoration rates and faster connection setup times, which introduce minimal delays for restoration operations following service interruptions. According to one embodiment, the invention may be deployed over WAN networks, among other networks. For example, the invention may provide a fast connection setup for transporting Ethernet frames over a SONET network.

The invention further provides a method and system for improving service restoration speeds or reducing connection setup times associated with VCAT networks. For example, the invention expands VCAT timeslot availability to include CCAT timeslot availability. One of ordinary skill in the art will readily appreciate that the invention may be applied to different types of networks, including optical transport networks (OTN), among other networks.

The invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of establishing a fast virtual concatenation (VCAT) connection, the method comprising:
   receiving at a network element a data signal having a VCAT path computation for a virtual concatenation network;
   analyzing available contiguous concatenation (CCAT) timeslots at the network element for transporting the data signal through the virtual concatenation network;
   adjusting the VCAT path computation at the network element to include transporting the data signal using the available CCAT timeslots; and
   issuing at least one command from the network element to route the data signal through the VCAT network using the available CCAT timeslots.

2. The method according to claim 1, further comprising using auto-concatenation at network nodes traversed by the data signal.

3. The method according to claim 2, wherein using auto-concatenation includes signaling to the network element that the data signal is transported using VCAT rates that differ from indicated CCAT rates.

4. The method according to claim 1, further comprising selecting at least one largest available CCAT timeslot to transport the data signal.

5. The method according to claim 4, further comprising modifying the selected at least one largest available CCAT timeslot to comply with bandwidth availability of the VCAT network.

6. The method according to claim 1, wherein issuing at least one command to route the data signal through the VCAT network includes providing cross-connections between ports of the network element.

7. A network element for establishing a fast virtual concatenation (VCAT) connection, the network element comprising:
   an input port;
   a transceiver operable to receive a data signal from the input port having a VCAT path computation for a virtual concatenation network; and
   a processor electrically connected to the transceiver, the processor operable to:
   analyze available contiguous concatenation (CCAT) timeslots for transporting the data signal through the virtual concatenation network;

adjust the VCAT path computation to include transporting the data signal using the available CCAT timeslots; and issue at least one command to route the data signal through the VCAT network using the available CCAT timeslots, wherein the network element is operable to establish fast VCAT connections.

8. The network element according to claim 7, wherein the transceiver is operable to access expanded available CCAT timeslots.

9. The network element according to claim 8, wherein the processor is further operable to use auto-concatenation for the network element traversed by the data signal, wherein the auto-concatenation signals to the network element that the data signal is transported using VCAT rates that differ from indicated CCAT rates.

10. The network element according to claim 7, wherein the processor is further operable to select at least one largest available CCAT timeslot to transport the data signal.

11. The network element according to claim 10, wherein the processor is further operable to modify the selected at least one largest available CCAT timeslot to comply with bandwidth availability of the VCAT network.

12. The network element according to claim 7, further comprising an output port, wherein the processor issues at least one command to route the data signal through the VCAT network by providing cross-connections between the input port and the output port of the network element.

13. A network element for establishing a fast virtual concatenation (VCAT) connection, the network element comprising:

an input port;

a path computation module that receives a data signal from the input port having a VCAT path computation for a virtual concatenation network, the path computation module analyzing available contiguous concatenation (CCAT) timeslots for transporting the data signal through the virtual concatenation network, the path computation module adjusting the VCAT path computation to include transporting the data signal using the available CCAT timeslots; and a routing and signaling control module, the routing and signaling control module issuing at least one command to route the data signal through the VCAT network using the available CCAT timeslots.

14. The network element according to claim 13, wherein the path computation module selects at least one largest available CCAT timeslot to transport the data signal.

15. The network element according to claim 14, wherein the path computation module modifies the selected at least one largest available CCAT timeslot to comply with bandwidth availability of the VCAT network.

16. The network element according to claim 13, wherein the path computation module accesses expanded available CCAT timeslots.

17. The network element according to claim 13, wherein the routing and signaling control module uses auto-concatenation at the network element traversed by the data signal to signal to the network element that the data signal is transported using VCAT rates that differ from indicated CCAT rates.

18. The network element according to claim 13, wherein the routing and signaling control module issues at least one command to route the data signal through the VCAT network by installing cross-connections between ports of the network element.

19. The network element according to claim 13, wherein the path computation module routes the data signal using a plurality of connections.

20. The network element according to claim 13, wherein the path computation module operates on a Synchronous Optical Network.

* * * * *